Nov. 5, 1957 G. F. WAITE 2,812,215
ORNAMENTAL HUB CAP
Filed Oct. 22, 1953 2 Sheets-Sheet 1
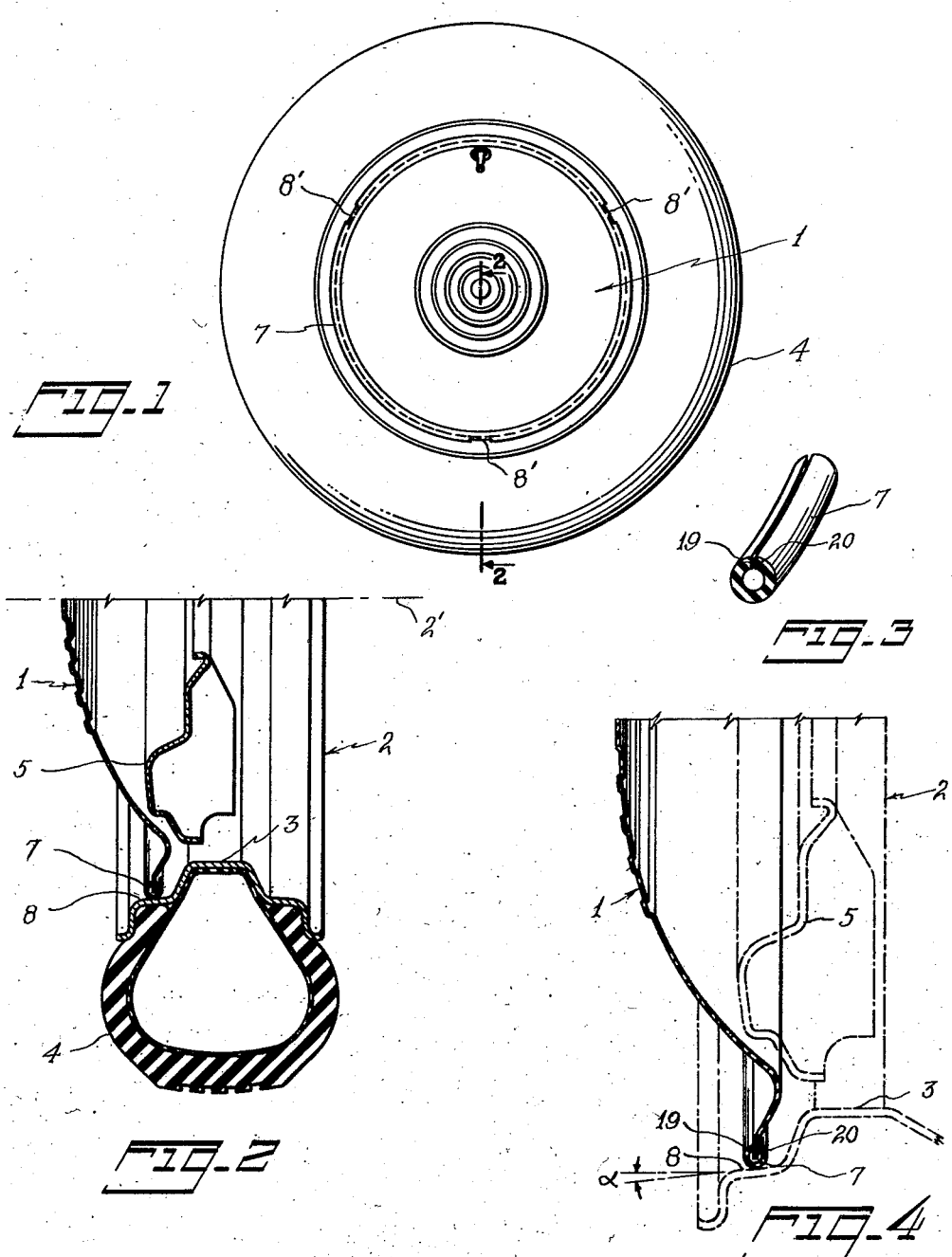
INVENTOR
GEORGE F. WAITE
BY *Orin R. Severn*
his ATTORNEY Nov. 5, 1957   G. F. WAITE   2,812,215
ORNAMENTAL HUB CAP Filed Oct. 22, 1953   2 Sheets-Sheet 2

INVENTOR
GEORGE F. WAITE
BY
his ATTORNEY

United States Patent Office 2,812,215
Patented Nov. 5, 1957

2,812,215

ORNAMENTAL HUB CAP

George F. Waite, Pelham, N. Y., assignor to Curtiss-Wright Corporation, a corporation of Delaware Application October 22, 1953, Serial No. 387,679

4 Claims. (Cl. 301—37)

My invention relates to ornamental hub caps or wheel covers for automotive vehicles and is particularly directed to wheel covers of a disc type constructed from a lightweight material as for example aluminum or plastic.

A principal object of my invention is to provide a wheel cover of this type having novel and improved means for securing the cover disc to a wheel and rim structure including a bead or ring of resilient material adapted to frictionally engage the wheel rim for holding the cover on the wheel.

It is another object of my invention to provide a wheel cover of the described type wherein the bead or ring is formed in such a manner as to compensate for dimensional changes in the cover due to varying climatic conditions.

It is still another object of my invention to provide a wheel cover which can be easily constructed wholly of plastic or other suitable inexpensive light-weight sheet material without the necessity for metal fastening, etc., parts for holding the cover on a wheel, or for any other purpose, thus enabling the cover by reason of its simple construction and the elimination of metal parts to be light in weight and produced at low cost.

The invention will be more fully set forth in the following description referring to the accompanying drawings, and the features of novelty will be pointed out with particularity in the claims annexed to and forming a part of this specification.

Figure 5:
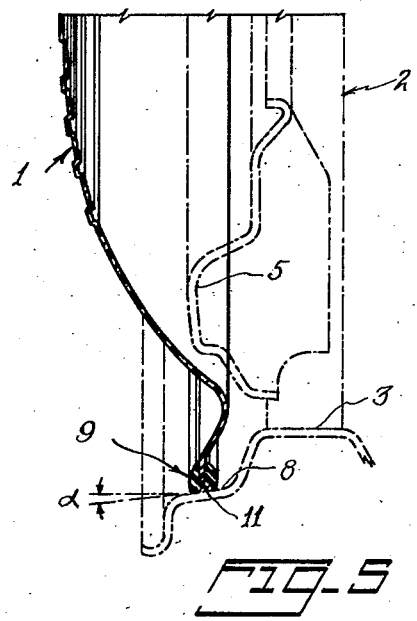
Figure 6:
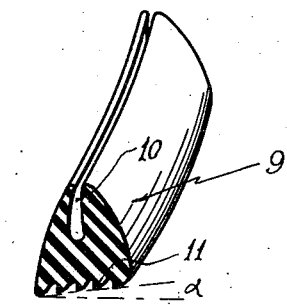
Figure 8:
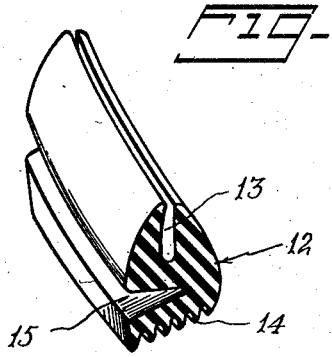
Figure 7:
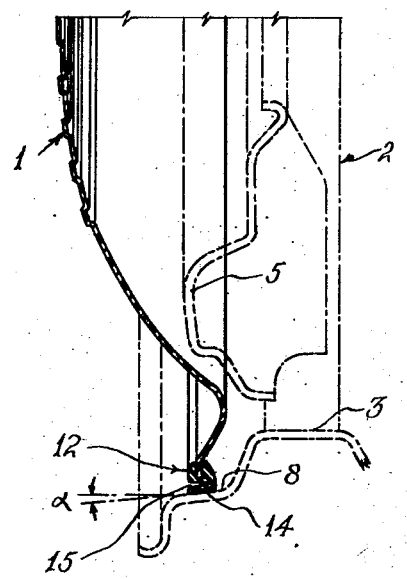
Figure 9:
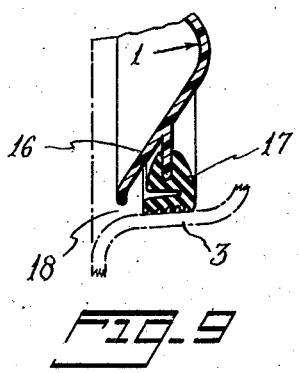

Referring to the drawings, Fig. 1 is a side elevational view of an automobile wheel fitted with a wheel cover constructed according to the inventive concept. Fig. 2 is a somewhat enlarged sectional view taken on the plane of the line 2—2 of Fig. 1. Fig. 3 is an enlarged perspective view of the retaining ring for the wheel cover. Fig. 4 is an enlarged fragmentary sectional view showing the resilient retaining ring of the cover in contact with the wheel rim flange. Fig. 5 is an enlarged sectional view showing a modified form of retaining ring on the wheel cover and in contact with the rim flange. Fig. 6 is an enlarged perspective view showing the retaining ring of Fig. 5. Fig. 7 is an enlarged sectional view showing still another form of the retaining ring on the wheel cover and in contact with the rim flange. Fig. 8 is an enlarged perspective view showing the ring of Fig. 7. Fig. 9 is a vertical sectional fragmentary view of a wheel cover provided with an extension or skirt portion for substantially covering the retaining ring of the wheel cover.

The wheel cover 1 which is also commonly known as a hub cap is shown mounted on an automobile wheel 2 which includes the usual metal rim portion 3 for supporting a tire 4 and a body portion 5 which extends outwardly from the wheel axis 2' and is connected to the rim portion in some suitable manner as by rivets. In accordance with my invention, the wheel cover 1 is secured to the wheel by frictional engagement therewith by means of a resilient bead or ring 7 attached to the cover, in the present instance to the periphery. The ring 7 is caused to engage the flange 8 of rim 3 when the cover is pressed into position on the wheel, and in such engagement the cover is prevented from becoming dislodged from the wheel despite shock and vibration to which the wheel is subjected as it travels over varying conditions of road. Rim flange 8 is substantially parallel to the wheel axis extending at only a small angle α to the horizontal in the normal position of the wheel on a vehicle so that there is little or no tendency for the cover to be dislodged laterally from the wheel.

In the first form of my invention (Figs. 1 to 4), the retaining ring 7 is formed from a length of resilient tubing slit along its length at one side thereof and is fitted about the periphery of the cover. By reason of the natural resiliency of the ring which is preferably formed from rubber but alternately may be formed from a suitable plastic as for example polyvinyl chloride or polyethylene, the edges 19 and 20 grip the opposite sides of the wheel cover to maintain the cover and ring in assembled relationship. If desired the ring 7 may be secured to the cover with a suitable cement to provide a permanent connection between the cover and ring. Alternatively, the ring 7 may be secured to the cover by wire stitching, stapling or by riveting. In the secured position of the cover 1 on the wheel the peripheral ring 7 is compressed against the steel rim flange 8 with a force substantially normal to the flange and of a magnitude such that although the disc may be jarred (during movement of the wheel) and acted upon by forces tending to dislodge the disc laterally from the wheel, the frictional force created by reason of the forced engagement between the resilient ring and metal rim is sufficiently great to maintain the disc in position. An important consideration is that the coefficient of friction between the material used for the retaining ring and the steel flange be high. It is intended that the relative resiliency of the cover and its peripheral ring be such that while the ring is compressed in the secured position of the wheel cover on the wheel no appreciable distortion occurs in the wheel cover itself so that the cover exerts no force on the resilient ring tending to dislodge it by reason of the wheel cover attempting to assume its natural configuration.

Preferably the wheel cover 1 is formed from a plastic material, as for example cellulose acetate butyrate material, rigid vinyl or impact styrene, although any other suitable light-weight material such as aluminum may be utilized if desired. Summarizing, the relationship between the structures of the cover and ring should be such that the ring is more resilient so that it can be compressed without materially stressing the cover itself.

As shown, the resilient bead is formed with a number of cut-outs 8' in the outer edge to provide openings when the cover is on the wheel for drainage purposes and to facilitate the insertion of a screw driver or tool between the wheel and bead for removing the cover.

In a modified form of my invention (Figs. 5 and 6) I provide a retaining bead or ring 9 of resilient material substantially solid rather than tubular in form, having a tapered slit 10 which extends generally vertically to receive the peripheral or attaching edge of the wheel cover and having a plurality of serrations 11 which provide surfaces for engaging the rim flange 8. The ring 9 may be force-fitted to the wheel cover 1, the upper ends of the slit being caused to grip the opposite surfaces of the cover by reason of the taper of the slit, or the surfaces of the slit may be cemented to the wheel cover. As shown, the serrations 11 which provide the gripping surface are inclined at a slight angle to the horizontal to coincide with the angle which the rim flange bears to a horizontal line so that the serrations are in the proper position for engaging the rim flange when the wheel cover is fitted to the wheel. The retaining ring 9 functions in a manner similar to that of the ring 7 of the first described form of my invention. The serrations 11, however, offer a greater resistance to the sliding or slipping of the ring on the steel rim flange to more securely fix the position of the wheel cover on the wheel by reason of the multiple line-contact engagement between the rim and said serrations.

In still another modified form of my invention (Figs. 7 and 8) I provide a resilient retaining ring 12 having a form substantially corresponding to that of the retaining bead or ring 9 of the second described form of my invention and including a tapered generally vertically extending slit 13 and serrations 14 for the engaging surface but also having another slit or cut-out 15 which is provided to compensate for dimensional changes in the wheel cover caused by varying climatic conditions. The ring 12 may be secured to the wheel cover 1 in the same manner as the ring 9 of the second described form of my invention. In the fitted position of the cover on the wheel the slit 15 is closed somewhat and the serrations 14 are evenly compressed against the rim flange. The slit 15, however, remains open to an extent such that any changes in the size or shape of the wheel cover can be taken up at the slit 15. The retaining ring in this form of my invention as well as the retaining ring of the second described form of my invention functions in a manner similar to that already described in connection with the tubular type retaining ring as first described; that is, the retaining rings are compressed against the rim flange to an extent such that frictional force between the flange and ring is great enough to prevent any lateral slipping or sliding of the ring on the flange in a direction tending to dislodge the wheel cover from the wheel. As already pointed out in connection with the first described form of my invention, the relative resiliencies of the material of the hub cap and its retaining ring are such that all compression occurs in the ring itself and there is virtually no distortion of the cover. Obviously usage of the term "bead" or "ring" throughout the specification is not intended to limit the form of the resilient means on a peripheral edge of the wheel cover for securing the cover to the wheel and that such means may have a non-circular cross-section as in the second and third forms of my invention or may assume any other suitable form.

In each of the various forms of my invention the wheel cover may be provided with a skirt portion 16 (Fig. 9) for substantially concealing a peripheral ring or bead 17 by means of which the cover is secured to the wheel. This skirt portion may be formed as an integral portion of the cover as shown and extends into fairly close proximity with the rim. Preferably an opening 18 is provided between the rim and peripheral edge of the skirt portion to permit the insertion of a screw driver or equivalent tool into said opening and through one of the cut-outs 8 already referred to in the bead or ring for removing the cover. Of course, if desired the skirt 16 could be extended to cover virtually the entire rim and one or more openings provided in such skirt portion to register with the openings 8 to facilitate removal of the cover.

It will now be apparent that I have provided a simplified and efficient wheel cover which includes novel and improved means for securing the cover to a wheel, that no metal parts are required for securing the cover to the wheel and that the resilient ring which is employed for this purpose is simple in form and can be economically produced. Since no metal parts are required for fastening the wheel cover to the wheel the entire cover including its fastening means may be constructed from suitable plastic materials or the like to provide a hub cap or wheel cover which is low in cost and has the advantage of being light in weight.

A reduction in the weight of the wheel cover achieved by my invention is of course advantageous insofar as it enables a lessening of the unsprung weight of a vehicle. Further beneficial results achieved due to a reduction in wheel cover weight include a reduction in the end thrust which the wheels of a vehicle may exert against the wheel bearings or axles when the vehicle is being turned or driven around a curve. This end thrust is due at least in part to centrifugal force exerted by the wheels and having a magnitude which is directly proportional to the combined weight of the wheel structure and wheel cover. Obviously, by reason of a reduction in the weight of the wheel cover the combined weight of the wheel structure and cover is also reduced to result in a reduction in the aforementioned end thrust exerted by the wheels.

In the case of a wheel cover constructed largely from plastic or other non-metallic material in the manner hereinbefore described, the opportunity for unwanted metal to metal contact between parts of the wheel cover including the locking devices and between the cover and the wheel structure to which the cover is attached is eliminated. Applicant's cover therefore constitutes a distinct advantage in that there is no possibility of noise occurring due to contact between metal parts and this is especially important during braking when the greatest likelihood exists of relative motion occurring between moving parts.

It should be understood that this invention is not limited to specific details of construction and arrangement thereof herein illustrated, and that changes and modifications may occur to one skilled in the art without departing from the spirit of the invention. For example, instead of the continuous peripheral bead or ring described for securing the cover to the wheel, a series of resilient sections attached to a peripheral edge of the cover and forming a discontinuous bead might be utilized, and obviously such an alternate construction is contemplated as being within the scope of my invention.

What is claimed is:

1. A wheel cover comprising a disc-like member of light-weight sheet material and comparatively resilient bead structure composed of rubber-like material mounted on said member in concentric relation thereto and adapted to hold said cover on a flange portion of said wheel by frictional gripping engagement therewith, said bead being attached to a circular edge portion of said disc-like member and having a lateral circular groove in the outside side wall of said bead, the portion of said bead that is spaced from said disc-like member by said groove having a serrated gripping surface for engagement with said flange portion.

2. A wheel cover comprising a disc-like member of light-weight sheet material and comparatively resilient bead structure composed of rubber-like material mounted on said member in concentric relation thereto and adapted to hold said cover on a flange portion of said wheel by frictional gripping engagement therewith, said bead being attached to a circular edge portion of said disc-like member and having a circumferential slot-like groove extending laterally into the outside side wall of said bead, the portion of said bead that is spaced from said disc-like member by said groove having a surface for gripping engagement with said flange portion, said groove compensating for dimensional changes in said disc-like member due to variations in climatic conditions.

3. In combination; a wheel structure which includes a body part extending outwardly from the wheel axis, and a tire rim secured thereto having a flange portion extending generally parallel to the wheel axis; and a wheel cover which includes a generally circular member of sheet material, and a comparatively resilient bead mounted in concentric relation thereto having a serrated gripping surface in frictional engagement with the flange portion of the tire rim for holding the wheel disc on the wheel structure; said bead having a lateral circular groove in the side wall to compensate for dimensional changes in the circular member due to variations in climatic conditions.

4. In combination; a wheel structure which includes a body part extending outwardly from the wheel axis, and a tire rim secured thereto having a flange portion extending generally parallel to the wheel axis; and a wheel cover which includes a generally circular wheel disc of sheet material, and a comparatively resilient bead mounted in concentric relation thereto having a serrated gripping surface in frictional gripping engagement with the flange portion of the tire rim; the bead having a lateral groove in the side wall to compensate for dimensional changes in the circular member, and said circular member having a skirt portion for concealing the lateral groove in the bead.

References Cited in the file of this patent

UNITED STATES PATENTS

| | | |
|---|---|---|
| 1,373,889 | Johnston | Apr. 5, 1921 |
| 1,969,088 | Maranville | Aug. 7, 1934 |
| 2,615,741 | Nathan | Oct. 28, 1952 |
| 2,618,513 | Horn | Nov. 18, 1952 |